United States Patent [19]
Ward et al.

[11] Patent Number: 5,747,961
[45] Date of Patent: May 5, 1998

[54] BEAT FREQUENCY MOTOR POSITION DETECTION SCHEME FOR TUNING FORK GYROSCOPE AND OTHER SENSORS

[75] Inventors: Paul A. Ward, Roslindale; Anthony S. Kourepenis, Acton, both of Mass.

[73] Assignee: The Charles Stark Draper Laboratory, Inc., Cambridge, Mass.

[21] Appl. No.: 541,079

[22] Filed: Oct. 11, 1995

[51] Int. Cl.$^6$ .................................................. G01P 15/14
[52] U.S. Cl. .................... 318/646; 318/648; 73/504.16; 73/504.19
[58] Field of Search .................................. 318/646, 648; 73/504.02–504.16, 514.01–514.38

[56] References Cited

U.S. PATENT DOCUMENTS

| | | | |
|---|---|---|---|
| 4,409,836 | 10/1983 | Comroe et al. | 73/504 |
| 4,930,351 | 6/1990 | Mary et al. | 73/505 |
| 5,205,171 | 4/1993 | O'Brien et al. | 73/517 |
| 5,285,686 | 2/1994 | Peters | 73/505 |
| 5,461,916 | 10/1995 | Fujii et al. | 73/514.32 |
| 5,481,914 | 1/1996 | Ward | 73/504.16 |
| 5,488,863 | 2/1996 | Mochidor et al. | 73/504.16 |
| 5,533,397 | 7/1996 | Sugitani et al. | 73/504.16 |
| 5,576,250 | 11/1996 | Diem et al. | 437/228 |
| 5,581,035 | 12/1996 | Greiff | 73/514.32 |
| 5,600,064 | 2/1997 | Ward | 73/504.04 |
| 5,604,309 | 2/1997 | Ward | 73/504.02 |
| 5,608,351 | 3/1997 | Ward | 330/107 |

*Primary Examiner*—Brian Sircus
*Attorney, Agent, or Firm*—Weingarten, Schurgin, Gagnebin & Hayes LLP

[57] ABSTRACT

A tuning fork gyroscope has an in-plane position sensitive pick-off to which an AC or AC+DC bias is applied. Intermodulation is exploited to produce beat-notes between the applied frequency and the motor frequency at amplitudes proportional to motor amplitude, but unaffected by error sources such as spurious substrate charge accumulation. The beat-notes are used to control motor amplitude without the effects of charge accumulation.

21 Claims, 2 Drawing Sheets

5,747,961

BEAT FREQUENCY MOTOR POSITION DETECTION SCHEME FOR TUNING FORK GYROSCOPE AND OTHER SENSORS

TECHNICAL FIELD

This invention relates generally to tuning fork gyroscopes, and more particularly to an improved method and circuit for controlling motor amplitude in a tuning fork gyroscope.

BACKGROUND OF THE INVENTION

The basic theories of operation and construction of tuning fork gyroscopes are now fairly well known. Typically, tuning fork gyroscopes, as shown in U.S. Pat. No. 5,349,855 entitled COMB DRIVE MICROMECHANICAL TUNING FORK GYROSCOPE, issued to Bernstein et al., include silicon proof masses which are suspended by support flexures above a glass substrate, and comb electrodes which are used for oscillating the proof masses. Metallic sense electrodes are disposed on the glass substrate below the proof masses for detecting Coriolis motion by indicating out-of-plane capacitance changes. Because tuning fork gyroscopes operate in this manner, it is desirable that the amplitude of the oscillation be held at a predetermined constant in order to provide a more accurate output indicating rate.

Prior to the present invention the amplitude of the oscillating motor of tuning fork gyroscopes had been controlled by a conventional servo loop. In this technique motor position is converted to a proportional voltage by measuring charge variation on a capacitive in-plane pick-off which is biased with a DC voltage. The resulting motor position signal is amplified and detected by a full wave rectifier. The rectifier output is then filtered, and the filtered voltage compared against a reference voltage; the difference forming an error voltage. This error voltage is then used to control the motor drive amplitude using a loop controller to adjust motor amplitude to a predetermined constant. However, this particular technique has a potential drawback.

This conventional servo loop may have some instability in the motor in-plane pick-off. The sensitivity of the DC biased pick-off varies slowly over time due to a spurious charge accumulation on the glass substrate beneath the pick-off electrode. As this charge accumulates on the glass, the sensitivity of the in-plane pick-off is modified. In response, the loop controller calls for modified drive force to compensate. The result is a motor amplitude transient wherein amplitude changes over time as substrate charge accumulates. This will result in lower accuracy than is otherwise possible because of the relationship between amplitude and Coriolis force in the system.

SUMMARY OF THE INVENTION

An object of the present invention is to provide an improved motor amplitude control circuit for a tuning fork gyroscope.

Another object of the present invention is to provide stable motor amplitude in a tuning fork gyroscope.

Yet another object of the present invention is to provide a tuning fork gyroscope with a stable gyro scale factor.

Even yet another object of the present invention is to provide an inexpensive motor amplitude control circuit for a tuning fork gyroscope which will provide a stable gyro scale factor.

According to the present invention, an AC or AC+DC bias is applied to a tuning fork gyroscope to produce an output signal from which motor amplitude can be construed. In further accord with the present invention, an AC or AC+DC bias is applied to a motor in-plane position sensitive pick-off to provide an output signal from which beat-notes proportional to motor amplitude are used to provide motor drive control signals.

The present invention improves on the prior art systems by applying AC or AC+DC bias to the motor in-plane pick-off, and by exploiting intermodulation to produce beat-notes between the applied signal and the motor of the tuning fork. The beat-note amplitudes are proportional to motor amplitude but are unaffected by spurious charge buildup on the substrate. These beat-notes are detected and used to determine and control motor amplitude. Further, the present invention can be easily implemented on an ASIC or single chip at relatively little additional expense. The tuning fork gyroscope can thus be controlled without compensating for the spurious charge buildup on the glass substrate.

The present invention could also be used in applications other than tuning fork gyroscopes. Using the technique disclosed herein it is possible to detect the position of a vibratory member in the presence of charge accumulation by heterodyning an applied voltage by a capacitance (q=C*V) and detecting one or more charge sidebands. The charge is naturally a perfect multiplier (heterodyner) of voltage and capacitance.

BRIEF DESCRIPTION OF THE DRAWING

The foregoing objects and features of this invention may be more fully understood from the following detailed description of the Drawing in which.

DETAILED DESCRIPTION OF THE DRAWING

Figure 1:
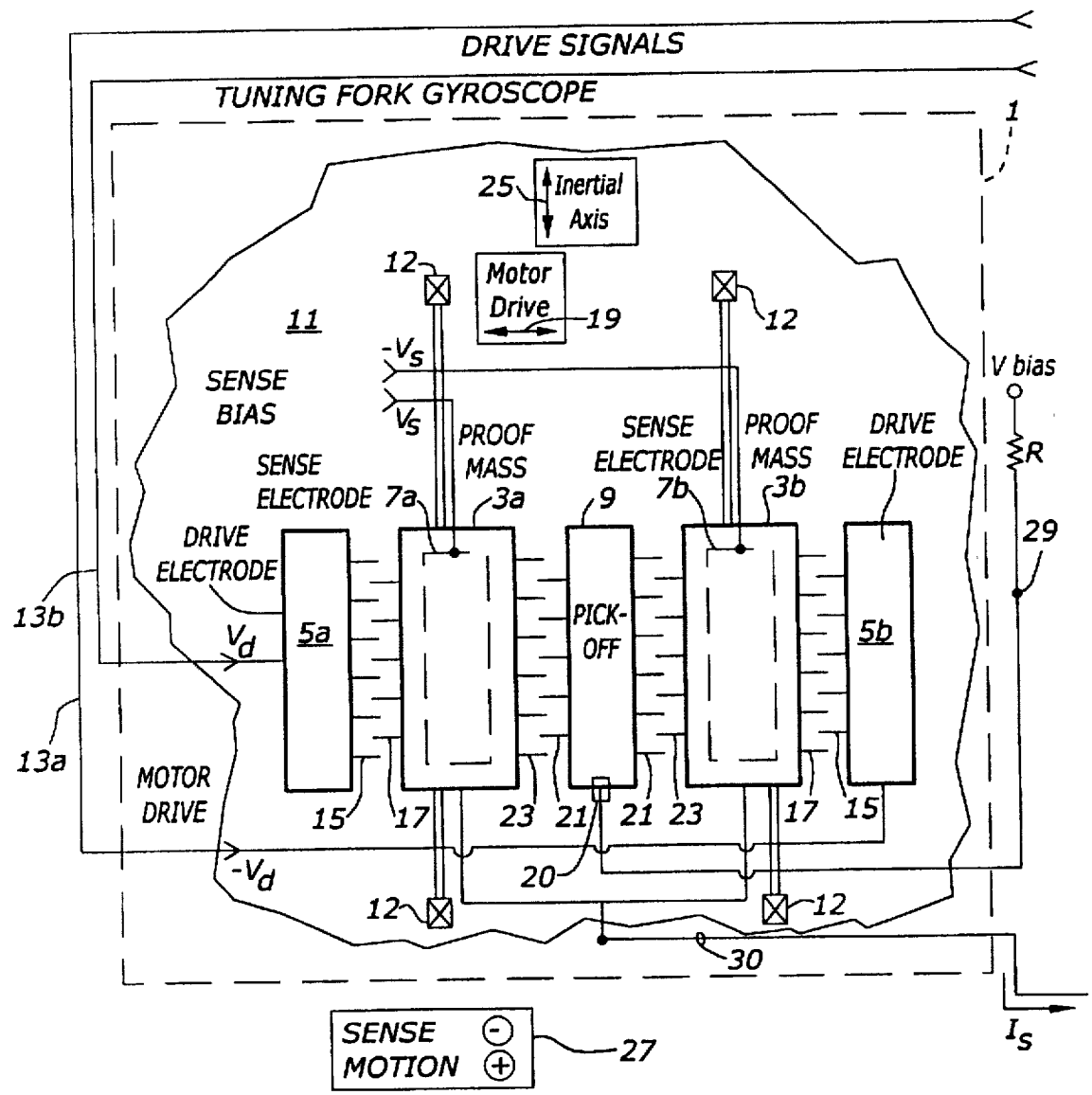
FIG. 1 is a schematic/block diagram of a tuning fork gyroscope according to the present invention.

Referring to FIG. 1, a tuning fork gyroscope 1 includes a pair of proof masses 3a, 3b, a pair of drive electrodes 5a, 5b, a pair of out-of-plane sense electrodes 7a, 7b, and a fixed motor in-plane pick-off 9 (sometimes referred to in the art as an in-plane sense electrode). The tuning fork gyroscope 1 also includes a glass substrate 11 on which the out-of-plane sense electrodes are disposed. The term "motor" as used herein refers to the in-plane pick-off, proof masses and drive electrodes. The term "motor amplitude" is used to refer to the peak magnitude of physical deflection of the proof masses, and the term "motor frequency" is used to refer to the oscillation frequency of the proof masses.

The proof masses 3a, 3b and the motor in-plane pick-off 9 are suspended above the substrate and the out-of-plane sense electrodes 7a, 7b. More particularly, the proof masses 3a, 3b are suspended by support flexures 12 which permit movement of the proof masses relative to the fixed motor in-plane pick-off 9, the out-of-plane sense electrodes 7a, 7b, and the substrate.

The operation of the tuning fork gyroscope is electromechanical in nature, and has been described with detail in copending U.S. Pat. No. 5,481,914, entitled ELECTRONICS FOR CORIOLIS FORCE AND OTHER SENSORS, filed in the name of Paul Ward, which is incorporated herein by reference. Drive signals 13a, 13b are provided to the drive electrodes 5a, 5b, respectively, as shown. The drive electrodes 5a, 5b include a plurality of comb-like electrodes 15 extending therefrom and toward an adjacent one of the proof masses 3a, 3b. Similarly, the proof masses 3a, 3b have comb-like electrodes 17 extending toward the adjacent one of the fixed drive electrodes 5a, 5b and interleaved with the comb-like electrodes 15 of the corresponding drive electrode. As such, the electrostatic coupling of the drive signals 13a, 13b to the corresponding proof masses 3a, 3b by the drive electrodes 5a, 5b imparts vibration to the proof masses in the plane of the tuning fork gyroscope 1 and in the directions indicated by arrow 19 labelled "motor drive." A DC voltage $V_S$–$V_S$ (labelled "sense bias") is applied to the out-of-plane sense electrodes 7a, 7b for establishing a potential difference so that a change in the capacitance between the electrodes 7a, 7b and the adjacent proof masses 3a, 3b results in a change in charge on the proof masses 3a, 3b. At resonance, proof mass displacement lags drive force by ninety-degrees.

The motor in-plane pick-off 9 is disposed between the two proof masses 3a, 3b and has comb-like electrodes 21 extending from opposite sides thereof toward the adjacent one of the proof masses. Each of the proof masses has similar electrodes 23 extending toward the motor in-plane pick-off 9 and interleaved with the electrodes 21 of the motor in-plane pick-off 9, as shown.

In response to an inertial input, and specifically to a rotational rate about an input axis coplanar to the plane of vibration (labelled inertial axis 25), the proof masses 3a, 3b deflect out of the plane of vibration, i.e., about an output axis orthogonal to an input axis 27 (labelled "sense motion"). Such out-of-plane deflection of the proof masses 3a, 3b occurs at a frequency corresponding to the resonant frequency of the proof masses and with an amplitude corresponding to the input rotational rate. Thus, detection of out-of-plane deflection of the proof masses 3a, 3b provides a measure of the rotational rate.

The tuning fork gyroscope works on the principle of Coriolis force. Proof mass deflection and oscillation frequency are dependent in part upon the amplitude and frequency of the drive signals 13a, 13b. Using the drive signals, the proof masses 3a, 3b are driven in-plane at their resonant frequency. If the frequency and the amplitude of in-plane oscillation are large, the result is large in-plane velocity. In the presence of a rotation of the device about an axis orthogonal to the in-plane velocity but still coplanar, an out-of-plane force is produced on each proof mass. This effect can be expressed mathematically as follows:

$$F_c = 2m\vec{\Omega} \times \vec{V} \qquad \text{Eq. 1}$$

Where
m is the mass
$\vec{V}$ is the proof mass velocity and
$\vec{\Omega}$ is the input rate and
X denotes the vector cross product.

Because the two proof masses 3a, 3b exhibit anti-parallel, in-plane oscillation, their velocity vectors are in opposite directions and the out-of-the-plane Coriolis induced forces are anti-parallel. Anti-parallel out-of-plane forces displace the proof masses out-of-plane in proportion to the value of the sense axis transfer function evaluated at the oscillation frequency. This sense axis motion can be detected by measuring the charge variation of the proof masses when a bias is applied to the sense electrodes. For these reasons, velocity must be held constant in order to accurately measure input rate.

A bias signal, $V_{bias}$, is coupled to the in-plane pick-off 9 at 20 through a resistor R to enable detection of charge variations caused by displacement of the proof masses 3a, 3b in the plane of vibration. The resistor R with an impedance is connected between $V_{bias}$ and the in-plane pick-off to permit the signal at the pick-off to reflect modulation effects from charge, capacitance and voltage values. An output signal 29 (measured in Volts) from the in-plane pick-off is thus indicative of the in-plane deflection of the tuning fork gyroscope 1. In tuning fork gyroscopes prior to the present invention, $V_{bias}$ is a DC signal. As previously described, however, a spurious charge accumulation on the glass substrate creates problems with this technique. A substrate charge accumulates, and as the charge on the substrate drifts, the effective sensitivity of the conventional readout scheme also drifts. The impaired visibility of the actual position of the proof mass gives rise to a motor amplitude error when an amplitude control servo responds to an erroneous readout gain. The resulting amplitude transient causes a gyroscope scale factor transient because the Coriolis force which develops for a given input rate depends linearly on the product of motor position amplitude and motor oscillation frequency.

The present invention improves on the prior prevailing technique by exploiting intermodulation to produce beat-notes whose amplitudes are proportional to the motor position amplitude without contamination from substrate 11 charging. According to the present invention, the $V_{bias}$ applied to motor in-plane pick-off 9 at 20 is either DC+AC or AC alone, rather than DC alone.

In one embodiment, the $V_{bias}$ applied to the in-plane pick-off 9 at 20 is DC+AC. If the AC signal is sinusoidal, the in-plane pick-off applied voltage can be expressed as:

$$V_{mo}(t) = DC + A \cos \omega_c t \qquad \text{Eq. 2}$$

where
A is motor amplitude and
$\omega_c$ is an arbitrary carrier frequency.
The output signal 29 varies with time when the motor is oscillating. Thus, the charge developed on the in-plane pick-off 9 is given by:

$$q(t) = C(t) V_{mo}(t) = [C_o + C_p \cos \omega t][DC + A \cos \omega_c t] \qquad \text{Eq. 3}$$

where Cp is capacitance amplitude, and which can be rewritten as:

$$C_o DC + [C_o A + C_p DC] \cos \omega t + \qquad \text{Eq. 4}$$
$$\frac{(C_p A)}{2} \cos(\omega + \omega_c)t + \frac{(C_p A)}{2} \cos(\omega - \omega_c)t$$

It is now apparent that the first two terms in Eq. 4 are corrupted because of their dependence on DC. However, both of the last two terms (sidebands) are free of this contamination.

In addition to a constant charge and a component at the motor frequency, there is an upper sideband (USB) and a lower sideband (LSB). Importantly, charge accumulation on the substrate 11 acts to modify the effects of the DC electrode bias (denoted DC). Thus the USB and the LSB, which are unaffected by substrate charging, can be used as a measure of the amplitude of the in-plane pick-off capacitance to the proof-masses (readout capacitance). The amplitude of the readout capacitance is linearly proportional to the motor position amplitude, so that by maintaining the amplitude of one or more of the beat notes (sidebands) constant, the motor amplitude is maintained relatively constant. More particularly, motor amplitude is constant to the extent that the readout capacitance dimensions and electronic gains and bias are stable.

The technique of the present invention can be used to control motor amplitude in tuning fork gyroscopes and other sensors which use different forms of sense axis processing. For example, the $V_{bias}$ can include a large DC bias and a small AC bias, or may contain a large AC bias and no DC bias. The reason for optionally retaining the use of DC electrode bias in the tuning fork gyroscope control system is that the charge term at the motor frequency can be used as a demodulation reference and to develop the drive to regenerate the motor.

In connection with the technique of the present invention, conventional techniques can be used to synchronously detect sideband amplitudes and filter the result. Other such techniques can be used to compare the result against a reference, pass the result through a loop controller and use the controller output to drive an actuator, thus providing closed-loop control of the tuning fork gyroscope.

Figure 2:
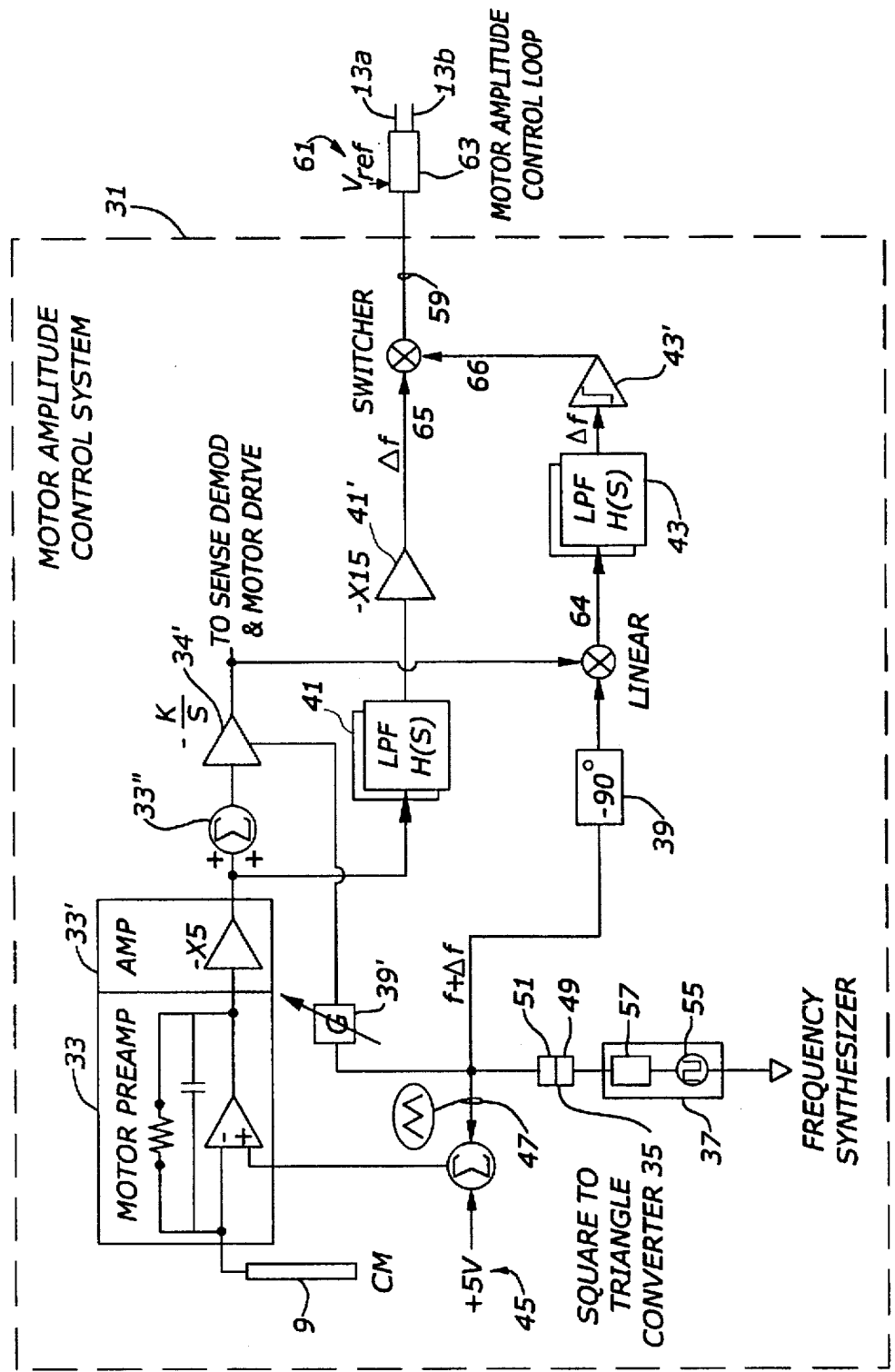
FIG. 2 is a block diagram of a motor amplitude control system for a tuning fork gyroscope such as that shown in FIG. 1.

FIG. 2 is a block diagram of a motor amplitude control system 31 for a tuning fork gyroscope such as that shown in FIG. 1. The motor amplitude control system includes the in-plane pick-off 9, a motor preamplifier 33, a square to triangle converter 35, a frequency synthesizer 37, a shifter 39, a first low pass filter (LPF) 41, and a second LPF 43. The first and second LPFs are nominally identical (4th order Butterworth filters, DC gain=121, 3 dbBW=3 kHz, AC coupled).

The in-plane pick-off 9 is connected to the motor charge preamplifier 33 inverting input as shown. The preamplifier non-inverting input is connected to a +5 V bias 45, upon which is superimposed a 200 mV p—p triangle wave 47 by a summer Σ. The triangle wave $V_{bias}$ applied through resistor R to the pick-off 9 is modified by the readout capacitance applied to the inverting input. The $V_{bias}$ from converter 35 to the non-inverting input is generated from a square to triangle wave converter 35 which includes a 1-bit DAC 49 and precision integrator 51. The 1-bit DAC is supplied CMOS level signals from a frequency synthesizer 37. The synthesizer 37 includes a 10.0 MHz TTL crystal oscillator 55 followed by a programmable frequency divider 57 (8 bits). Triangle wave frequency can be placed at f+df, where f is the motor frequency and df can be from greater than 0 Hz to several kHz (in about 40 Hz steps). Ideally, df should fall within the passband of the signal path, however this is not a precondition to an operational control system. A triangle wave is used because it is easily generated and low in harmonic energy.

The triangle wave 47 multiplied by readout capacitance provides, by beat effects, a double sideband signal at the motor charge amplifier output 20. Each sideband is about 500 microvolts in amplitude for a 10 micrometer motor amplitude. The lower sideband is selected by the first LPF 41, amplified by about 6500 V/V there and in amplifier 41 and then synchronously demodulated.

A demodulation reference is produced by shifting the triangle wave 47 fundamental by −90 degrees as shown in the shifter 39 to produce a shifted wave fundamental, and heterodyning the shifted wave fundamental by a sinusoid proportional to the motor velocity. This sinusoid is developed by summing, in summer 33", the output of preamplifier 33, after amplification in amplifier 33', with a signal from the $V_{bias}$ after passing through a variable gain 39' and then integrating the results in integrator 34'. The shifted, heterodyned wave fundamental 64 is then passed through the second LPF 43 and limited, in a limiter 43', providing a demodulation reference 66, which is multiplied by the second lower sideband signal 65 to result in a demodulated lower sideband signal 59.

The demodulated lower sideband signal 59 is proportional to actual motor amplitude and theoretically free from charge accumulation effects. As such, the demodulated lower sideband signal is put to use in controlling the tuning fork gyroscope by comparing the signal 59 with a reference voltage 61 in a standard motor amplitude control loop 63, and the difference (error) is nulled in the loop by driving the motor to a commanded and thus controlled constant amplitude. The USB could be used rather than the LSB with equally satisfactory results.

Those skilled in the art will appreciate that phase tracking is accomplished by using identical LPFs for processing the lower sideband signal and the demodulation reference. Also, the triangle wave should be subtracted out of the motor chain or the motor may not start.

From the discussion above, it will now be apparent that the present invention can be expressed as a method which includes applying an AC bias signal with or without a DC component to the in-plane pick-off of the tuning fork gyroscope. The method could also include other steps such as providing a motor charge preamplifier having first and second inputs, the in-plane pick-off being connected to the first input; producing a bias voltage including a +5 V and a 200 mV p—p triangle wave superimposed thereon, the bias voltage connected to the second input of the preamplifier, the triangle wave being generated from a square to triangle wave converter including a 1-bit DAC and a precision integrator, the 1-bit DAC supplied CMOS level signals from a frequency synthesizer including a 10.0 MHz TTL crystal oscillator followed by a programmable frequency divider (8 bits), the triangle wave having a frequency placed at f+df, where f is motor frequency and df is from greater than 0 Hz up to several kHz; multiplying the triangle wave by a readout capacitance to provide a double sideband signal; passing the double sideband signal through a LPF to provide a first lower sideband signal; amplifying the first lower sideband signal by about −15 V/V to produce a second lower sideband signal; synchronously demodulating the second lower sideband signal to produce a demodulated lower sideband signal; shifting the triangle wave fundamental by −90 degrees to provide a shifted wave fundamental; heterodyning the shifted wave fundamental by a sinusoid proportional to motor velocity to provide a first demodulation reference, selecting a lower sideband of the first demodulation reference to provide a second demodulation reference; limiting the second demodulation reference to provide a demodulation reference, multiplying the demodulation reference by the second lower sideband signal to produce a demodulated lower sideband, the demodulated lower sideband being proportional to motor amplitude and substantially free from charging effects; comparing the demodulated lower sideband against a reference voltage in the motor amplitude controller to provide an error signal; and nulling by driving the motor to a commanded amplitude using the error signal.

Further modifications of the invention herein disclosed will occur to persons skilled in the art and all such modifications are deemed to be within the scope of the invention as defined by the appended claims.

What is claimed is:

1. Apparatus for detection of rotational motion comprising:

at least one flexure supported proof mass;

an out-of-plane motion sense electrode disposed below said proof mass, said out-of-plane sense electrode disposed on a substrate;

a drive electrode operationally connected to said proof mass and operative to vibrate said proof mass in a plane of vibration;

an in-plane pick-off operationally connected to said proof mass in the plane of vibration;

a source of bias for said in-plane pick-off, said bias having one of an AC and AC+DC component(s); and an output signal indicative of motor amplitude provided by said in-plane pick-off.

2. The apparatus of claim 1 wherein said bias is AC.

3. The apparatus of claim 1 wherein said bias is AC+DC.

4. The apparatus of claim 3 wherein said AC bias is a triangle wave.

5. The apparatus of claim 1 further including a motor amplitude control system with a loop controller, said motor amplitude control system connected to provide drive signals to said drive electrode as a function of said output signal and a reference signal representative of a desired amplitude.

6. The apparatus of claim 5 wherein said motor amplitude control system includes a motor preamplifier electrically connected to said in-plane pick-off.

7. The apparatus of claim 6 wherein a DC bias having a triangle wave imposed thereon is connected to said motor preamplifier.

8. The apparatus of claim 7 wherein a first low pass filter (LPF) is operationally connected to said motor preamplifier.

9. The apparatus of claim 8 wherein said DC bias with triangle wave imposed thereon is shifted by 90 degrees and multiplied by a signal proportional to motor velocity, to provide a signal applied to a second LPF.

10. The apparatus of claim 9 wherein said first and second LPFs are 4th order Butterworth filters with a DC gain of about 121 and a 3 db BW of about 3 kHz.

11. The apparatus of claim 10 wherein said second LPF has an output, and a demodulation reference is provided by limiting said output of said second LPF.

12. The apparatus of claim 11 wherein said first LPF has an output, and a lower sideband signal is provided by amplifying said output of said first LPF.

13. The apparatus of claim 12 wherein a demodulated lower sideband proportional to motor amplitude and substantially free from charging effects is provided by multiplying said demodulation reference by said lower sideband signal.

14. A method for providing a tuning fork gyroscope output which is insensitive to charge accumulates on a substrate, the gyroscope including an in-plane pick-off, the method comprising:

applying a bias signal to the in-plane pick-off of the tuning fork gyroscope, said bias signal having one of an AC and AC+DC component; and processing a signal from said in-plane pick-off to provide an amplitude representative signal of lessened sensitivity to charge accumulation.

15. The method of claim 14 wherein said applying step includes applying a bias signal including a triangle wave.

16. The method of claim 15 including a further step of shifting said triangle wave to provide a shifted wave.

17. The method of claim 16 including a further step of heterodyning said shifted wave by a sinusoid proportional to motor velocity to provide a demodulation reference.

18. The method of claim 17 including a further step of providing a demodulated lower sideband being proportional to motor amplitude and substantially free from charging effects by multiplying said demodulation reference by a lower sideband signal.

19. A method for controlling motor amplitude in a motor of a tuning fork gyroscope with an in-plane pick-off which generates an output signal representative of motor in-plane displacement, the tuning fork gyroscope having a substrate material upon which electrical charge may accumulate, the method comprising the steps of:

providing a motor charge preamplifier having first and second inputs, the in-plane pick-off being connected to said first input;

producing a bias voltage including a +5 V and a 200 mV p—p triangle wave superimposed thereon, said bias voltage connected to said second input of said preamplifier, said triangle wave being generated from a square to triangle wave converter including a 1-bit DAC and a precision integrator, said 1-bit DAC supplied CMOS level signals from a frequency synthesizer including a 10.0 MHz TTL crystal oscillator followed by a programmable frequency divider (8 bits), said triangle wave having a frequency placed at f+df, where f is motor frequency and df is from greater than 0 Hz up to several kHz;

multiplying said triangle wave by a readout capacitance to provide a double sideband signal;

passing said double sideband signal through a LPF to provide a first lower sideband signal;

amplifying said first lower sideband signal to produce a second lower sideband signal;

synchronously demodulating said second lower sideband signal to produce a demodulated lower sideband signal;

shifting said triangle wave fundamental by 90 degrees to provide a shifted triangle wave fundamental;

heterodyning said shifted triangle wave fundamental by a sinusoid proportional to motor velocity to provide a first demodulation reference;

passing said first demodulation reference through a low-pass filter nominally identical to the main signal low-pass filter to provide a second demodulation reference;

limiting said second demodulation reference to provide a demodulation reference, said demodulation reference being multiplied by said second lower sideband signal to produce a demodulated lower sideband being proportional to motor amplitude and substantially free from charging effects;

comparing said demodulated lower sideband against a reference voltage in the motor amplitude controller to provide an error signal; and nulling by driving the motor to a commanded amplitude using said error signal.

20. A method for detecting the position of a member in the presence of charge accumulation comprising the steps of:

applying a time-varying voltage between the member and a sense electrode, between which a charge accumulation exists; and detecting a charge sideband of the charge accumulation modulation of capacitance and voltage between said members and said electrode.

21. Apparatus for detecting the position of a member in the presence of charge accumulation comprising:

a time-varying voltage applied between the member and a sense electrode, between which a charge accumulation exists; and a motor amplitude control system operative to detect a charge sideband of the charge accumulation modulation of capacitance and voltage between said members and said electrode.

* * * * *